United States Patent [19]

Orton

[11] Patent Number: 5,136,452

[45] Date of Patent: Aug. 4, 1992

[54] FUSE-PROTECTED RC SPEED CONTROLLER VARIATIONS

[76] Inventor: Kevin R. Orton, 970 Calle Negocio, San Clemente, Calif. 92672

[21] Appl. No.: 818,790

[22] Filed: Jan. 9, 1992

Related U.S. Application Data

[63] Continuation-in-part of Ser. No. 622,756, Dec. 5, 1990, Pat. No. 5,107,387.

[51] Int. Cl.⁵ .............................................. H02H 7/09
[52] U.S. Cl. ...................................... 361/33; 361/104; 337/187; 337/198; 318/16; 318/139; 446/456
[58] Field of Search ...................... 361/33, 82, 84, 104; 337/187, 197, 198, 216; 307/127; 318/6, 16, 139, 266, 370, 376, 371, 375, 293; 446/456

[56] References Cited

U.S. PATENT DOCUMENTS

| | | | |
|---|---|---|---|
| 4,164,726 | 8/1979 | Weibe | 337/215 |
| 4,305,030 | 12/1981 | Lorenz | 318/758 |
| 4,406,982 | 9/1983 | McClellan, Jr. | 318/139 |
| 4,450,397 | 5/1984 | Painter et al. | 318/375 |
| 5,043,640 | 8/1991 | Orton | 318/16 |

Primary Examiner—Steven L. Stephan
Assistant Examiner—Adolf Berhane
Attorney, Agent, or Firm—Loyal M. Hanson

[57] ABSTRACT

An RC controller includes a circuitboard with a circuit for variably coupling power from a battery to the drive motor of a radio controlled model. The circuit includes braking componentry that produces a low resistance path in parallel with the motor in order to brake the motor under operator control. The braking componentry includes a flyback diode and a semiconductor device connected across the terminals of the drive motor. The flyback diode may be a separate component or a part of the semiconductor device. According to a major aspect of the invention, a fuse is provided in series with the flyback diode to protect it against damage in the event the battery is connected backwards. The fuse is placed to protect the flyback diode without introducing an undesired voltage drop between the battery and the drive motor. Various fuse placements are disclosed. Instead of a separate fuse, one embodiment includes an unfused flyback diode that doubles as a fuse. To facilitate replacement, it may be pluggable or even soldered to terminals on the exterior of the controller housing in a user-accessible position. Another embodiment is arranged to operate in conjunction with a user-provided connection between one terminal of the battery and one terminal of the drive motor.

19 Claims, 3 Drawing Sheets

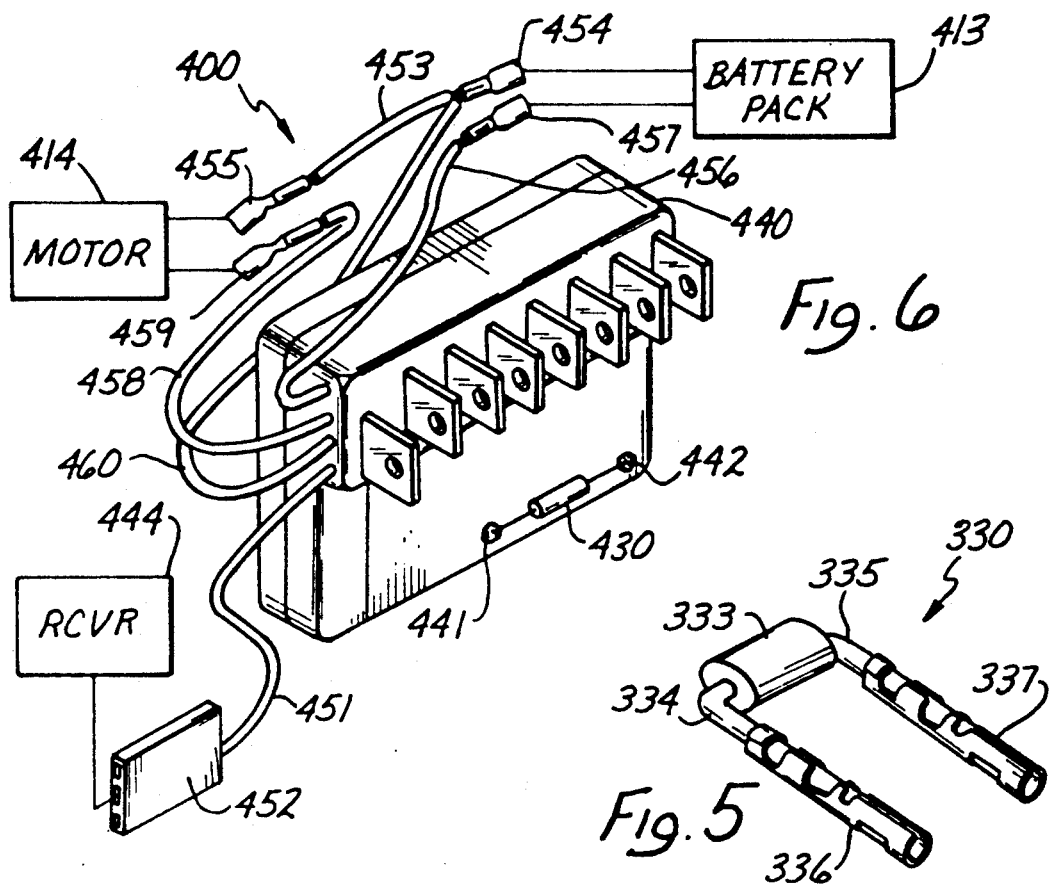
Fig. 6
Fig. 5
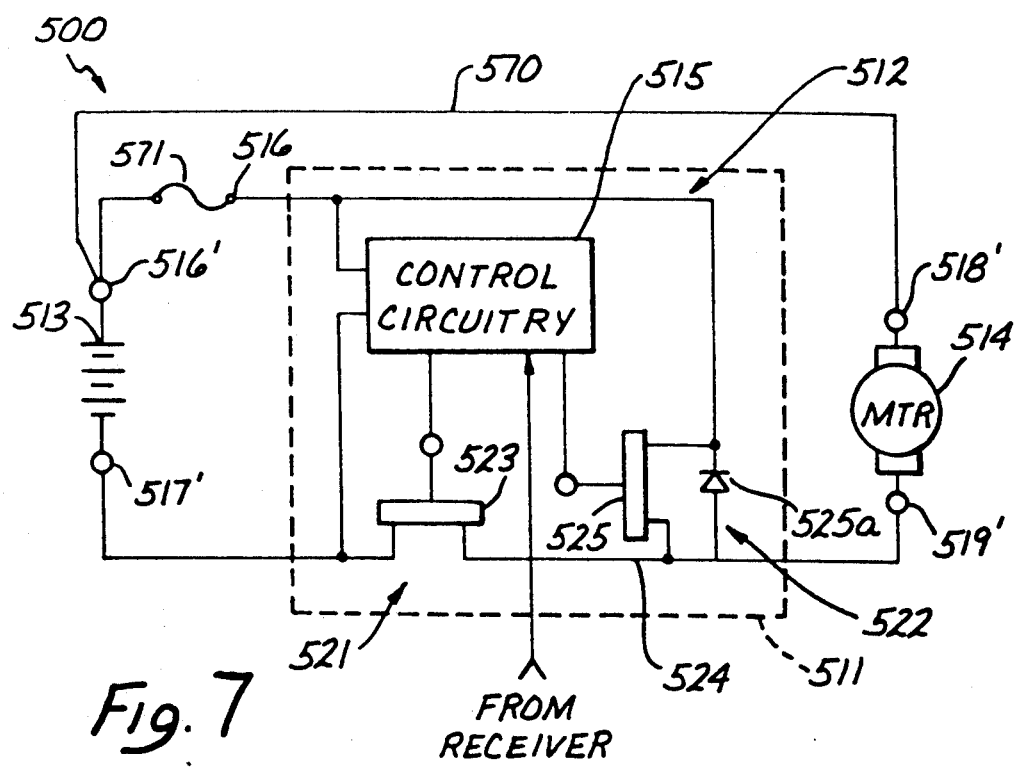
Fig. 7

FUSE-PROTECTED RC SPEED CONTROLLER VARIATIONS

CROSS REFERENCE TO RELATED APPLICATION

This application is a continuation in part of the United States patent application naming the same inventor that was filed Dec. 5, 1990 and assigned Ser. No. 622,756. That application issued Apr. 21, 1992 as U.S. Pat. No. 5,107,387.

BACKGROUND OF THE INVENTION

1. Technical Field

This invention relates generally to radio controlled (RC) models, and more particularly to a fuse-protected controller for an RC model.

2. Background Information

The parent application, of which this application is a continuation in part, describes a fuse-protected RC controller. The RC controller includes a circuit that couples power from a battery to the drive motor of an RC model for drive and braking purposes. The circuit includes two unfused legs electrically connecting the battery to the motor. They are unfused to avoid the voltage drop a fused leg would introduce. Instead of a fused leg, the RC controller includes a fuse in series with vulnerable braking components. The fuse protects the braking components in case the operator inadvertently installs the battery backwards.

The parent application specifics both a first unfused leg that couples the positive battery terminal to a first motor terminal and a second unfused leg that couples the negative battery terminal to a second motor terminal. However, it may be preferred in some installations to include only one unfused leg in the RC controller and rely on separate heavy-gauge wiring to establish the second unfused leg. Although contemplated that such a variation is part of the invention described in the parent application in the sense that any such wiring is part of the controller circuit, it is desirable to further focus on that aspect.

In addition, the parent application specifies a fuse in series with the braking componentry. For illustrative purposes, the fuse is shown in series with a metal oxide silicon field effect transistor (MOSFET). The MOSFET includes a protective diode that protects against the flyback voltage appearing when power to the motor is first switched off. However, the diode also presents a nearly direct short when the battery is connected backwards. So, the fuse is included to prevent damage to the diode in case of reverse battery polarity without introducing an undesired voltage drop between the battery and motor. However, it may be preferred in some controller circuits to use a separate flyback diode that is not part of the MOSFET. Although contemplated that such a variation is part of the invention described in the parent application, it is desirable to further focus on that aspect also.

SUMMARY OF THE INVENTION

This application alleviates the concerns outlined above by explicitly specifying some variations. The application describes fuse placement alternatives. It describes various flyback diode arrangements using a separate diode apart from the braking semiconductor device. It illustrates cabling techniques, and describes use of external wiring between battery and motor. The foregoing and other objects, features, and advantages become more apparent upon reading the following detailed description with reference to the illustrative drawings.

BRIEF DESCRIPTION OF THE DRAWINGS

FIG. 5 is a pictorial view of the pluggable flyback diode component in the fourth controller;

FIG. 6 is a pictorial view of a fifth controller that includes an unfused flyback diode mounted externally for ease of replacement; and FIG. 7 is a schematic diagram of a sixth controller that relies on a direct external connection between battery and motor instead of having two unfused legs in the controller circuit. It also illustrates fuse placement external to the controller housing.

DESCRIPTION OF THE PREFERRED EMBODIMENTS

The drawings show a controller 10 constructed according to the invention (FIG. 1) along with some variations (FIG. 2-7). The controller 10 is described in detail in the parent application of which this application is a continuation in part. That application is incorporated by this reference for the details provided. The variations in this application are similar to the controller 10 in many respects and so only major differences are described in detail.

Figure 1:
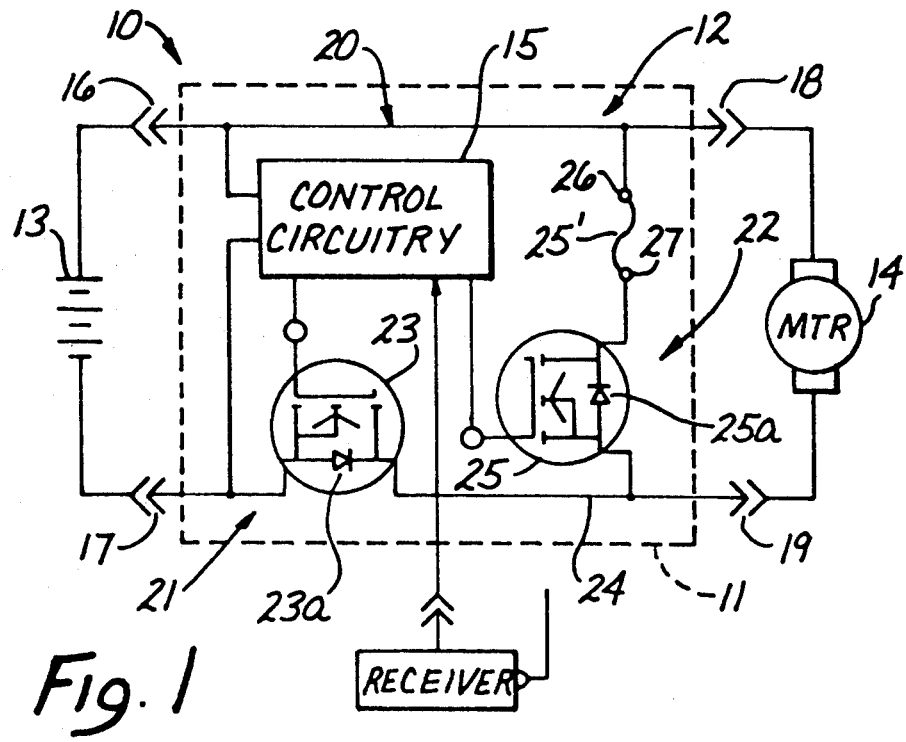
FIG. 1 of the drawings is a schematic diagram of an RC controller constructed according to the invention as illustrated in the parent application.

First recall various details of the controller 10. It includes a circuitboard 11 (shown in dashed lines) on which are mounted the components of a circuit 12. Those components may include, for example, various semiconductor devices, associated componentry, and a cable assembly that connects the circuit 12 to a battery 13 and a drive motor 14 of a radio controlled model. The circuit 12 variably couples power from the battery 13 to the drive motor 14, doing so under operator control according to information received by a receiver that is illustrated in FIG. 1 in block diagram form.

An operator communicates commands via radio to the receiver. Those commands are suitably communicated from the receiver to control circuitry 15. The control circuitry 15 is part of the circuit 12, and it combines with other portions of the circuit 12 to variably couple power to the motor 14 according to the operator commands.

The circuit 12 has a first input terminal 16 for connection to a first battery terminal of the battery 13 and a second input terminal 17 for connection to a second battery terminal of the battery 13. The circuit 12 also has a first output terminal 18 for connection to a first motor terminal of the drive motor 14 and a second output terminal 19 for connection to a second motor terminal of the drive motor 14. A first unfused leg 20 connects the first input terminal 16 to the first output terminal 18. It provides low resistance energy transfer between the battery 13 and the drive motor 14. In other words, it provides a low resistance path for the relative large current requirements of the motor 14. The first unfused leg 20 may take the form of a heavy trace on the circuitboard 12. It may also take the form of a heavy-gauge wire that is included in a cable assembly component of the circuit 12 and be soldered directly to both the first battery terminal and the first motor terminal.

Some existing attempts to provide fuse protection placed a fuse either in the first leg 20 or between one of the first and second terminals 16 and 17 and the battery 13. But doing so results in an increase in resistance between the battery 13 and the motor 14. That, in turn, produces an undesired voltage drop because of the high current drawn by the motor 14.

The controller 10, however, fuses just the componentry identified as vulnerable to a reverse polarity connection. That is the flyback diode in braking componentry subsequently described. The motor 14 usually remains undamaged by a reverse polarity connection. It just rotates backwards at high speed. The control circuitry 15 is powered by the battery 13 also, but it may include suitable protective circuitry of its own to protect against a reversed polarity connection. Speed control componentry 21 and braking componentry 22 are more vulnerable, however. The speed control componentry 21 generally includes a bank of several semiconductor devices 23 (e.g., MOSFET's) having substantial current carrying capability. That bank of semiconductor devices combines with the control circuitry 15 to serve as means for varying the resistance of a second unfused leg 24 of the cirucit 12 connecting the negative input terminal 17 to the second output terminal 19. Varying the resistance of the second leg 24 varies the amount of power coupled from the battery 13 to the motor 14 and that affects motor speed.

If the polarity of the battery 13 is reversed, a reverse current flows through diodes 23a within the semiconductor devices and that threatens damage. It turns out, however, that the bank of semiconductor devices 23 has sufficient current carrying capability through the diodes 23a for the current drawn by the motor 14, and so a reverse polarity connection does not damage the speed control componentry 21. As a result, that componentry need not be fuse-protected.

The braking componentry 22 does not use a bank of semiconductor devices, however. It usually includes just one semiconductor device 25 (e.g., a MOSFET) of substantially less current carrying capability. It combines with the control circuitry 12 to serve as means for providing a low resistance path in parallel with the motor 14 in order to brake the motor 14 under operator control. Since the braking circuitry 22 is usually turned ON when the speed control circuitry 21 is turned OFF, the braking circuitry 22 only handles the current flowing back from the motor 14 during braking. As a result, just one semiconductor device suffices.

But that one semiconductor device cannot handle the current under a reverse polarity connection. A diode 25a that is a part of the semiconductor device 25 has too little current carrying capability and so it can be more easily damaged. Thus, having identified the braking circuitry 22, and particularly the diode 25a, as the vulnerable circuitry, this inventon protects it with a series connected fuse 25' that is connected as illustrated so that current flowing through the diode 25a flows through the fuse 25'.

The illustrated connection also results in the fuse 25' not being in either of the unfused legs 20 and 24. So, the fuse 25' does not introduce an undesired voltage drop between the battery 13 and the motor 14. The fuse 25' can take any of various known forms within the broader inventive concepts described above. In the controller 10, it plugs onto first and second terminal posts 26 and 27 that are mounted on the circuitboard 11.

Considering now the controller 100 (FIG. 2), it is similar in many respects to the controller 10 and so only differences are discussed in further detail. For convenience, reference numerals designating parts of the controller 100 are increased by one hundred over those designating similar parts of the controller 10.

Like the controller 10, the controller 100 includes a circuitboard 11 and a circuit 112 on the circuitboard for variably coupling power from a battery 113 to a drive motor 114 of a radio controlled model. The circuit has a first input terminal 116 that connects to a first battery terminal 116' of the battery 113, and a second input terminal 117 that connects to a second terminal 117' of the battery 113. In addition, the circuit has a first output terminal 118 that connects to a first motor terminal 118' of the drive motor 114, and a second output terminal 119 that connects to a second motor terminal 119' of the drive motor 114. The input and output terminals may take any of various suitable forms, such as being part of a cable assembly connected to the circuitboard 111. Similarly, the battery and motor terminals may take any of various suitable forms, such as conventional terminals located right on the battery and motor.

A first unfused leg 120 couples the first input terminal 116 to the first output terminal 118. Speed control componentry 121 and braking componentry 122 are connected as illustrated to function as described for the controller 10. The speed control componentry 121 includes semiconductor devices 123 that combine with the control circuitry 115 to serve as means for varying the resistance of a second unfused leg 124 connecting the second input terminal 117 to the second output terminal 119. The braking componentry 121 serves as means for electrically coupling the output terminals 118 and 119 with a low resistance path in parallel with the drive motor 114 in order to brake the drive motor 114 under operator control.

Figure 2:
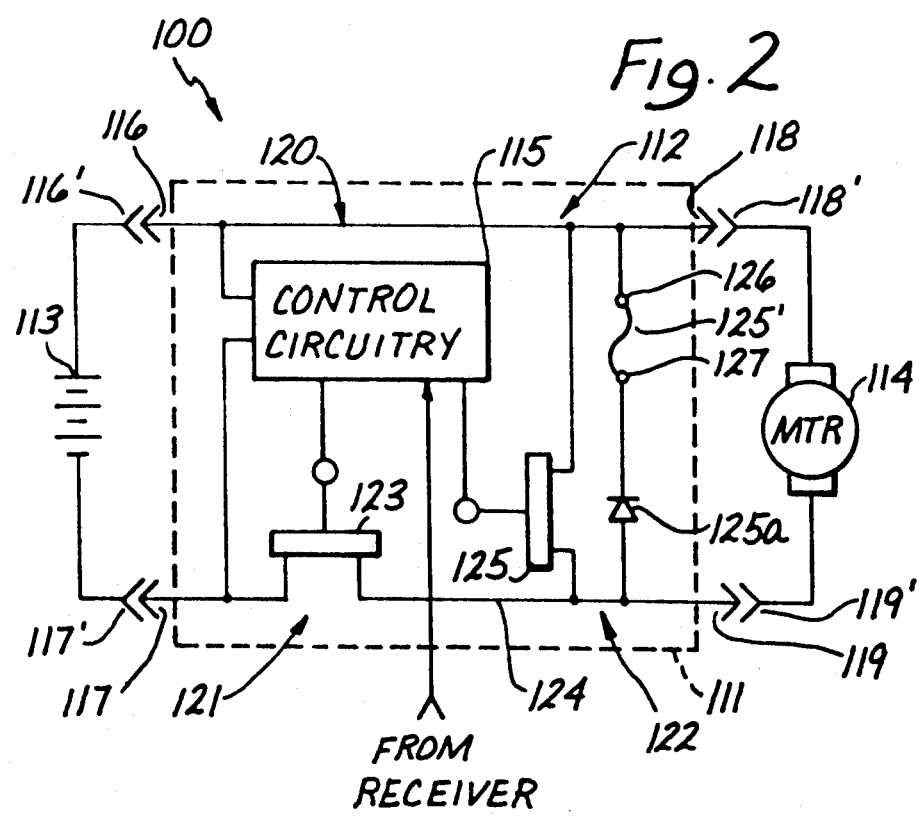
FIG. 2 is a schematic diagram of a second controller in which the brake circuitry includes a fused flyback diode separate from the brake semiconductor device.

Similar to the braking componentry 21 of the controller 10, the braking componentry 122 includes a semiconductor device 125 and a diode 125a. But unlike the braking componentry 21, the semiconductor device 125 and diode 125a of the controller 100 are separate components. In other words, the diode 125a is not formed as part of the semiconductor device 125. It is an entirely separate component. Preferably, the semiconductor device 125 includes no diode counterpart of the diode 25a shown in FIG. 1. Thus, a fuse 125' in FIG. 2 is connected in series with the diode 125a and not in series with the semiconductor device 125.

The fuse 125' may be mounted on the circuitboard 111 by any of various suitable means, preferably removably mounted by such means as fuse mountings 126 and 127. It may take any of various forms as long as it includes conductive material that melts, burns, breaks, or otherwise interrupts the flow of current in response to the current exceeding a particular amperage (e.g., a thin metal trace or other fusible material soldered to or otherwise mounted in the circuit). In other words, the circuit includes means in the form of a fuse connected in series with the braking componentry for protecting the braking componentry from damage. and it is intended that any means employed to perform the fusing function described be considered to fall within the scope of the claims.

Serving to conduct current during flyback periods of the drive motor 114, the diode 125a may be called a flyback diode. The flyback period occurs just after the drive motor 114 is switch from an ON state to an OFF state because that interrupts the flow of current from the battery 113 to the drive motor 114. As a result, a reverse polarity flyback voltage appears across the motor terminals. That effect is well known, and the polarity of the flyback voltage is such as to cause the diode 125a conduct in the forward direction of the diode 125a what may be called flyback current. That dissipates the flyback voltage for protection of the semiconductor device 125 and for rapid motor deceleration purposes.

Figure 3:
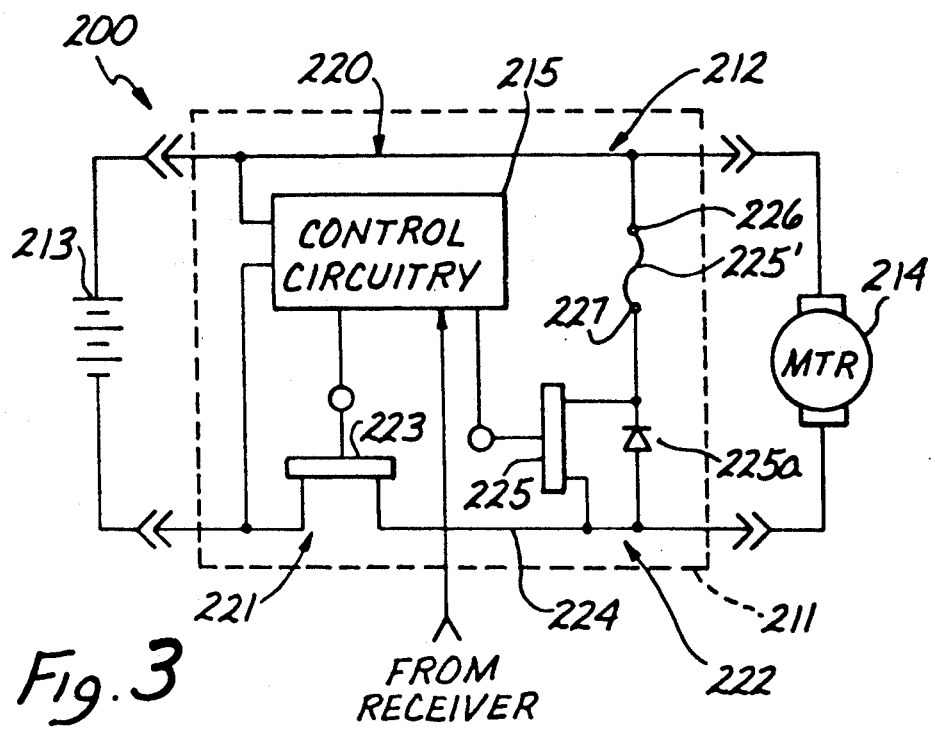
FIG. 3 is a schematic diagram of a third controller that is similar to the second except the fuse appearing in series with the parallel combination of the flyback diode and the brake semiconductor device.
Figure 4:
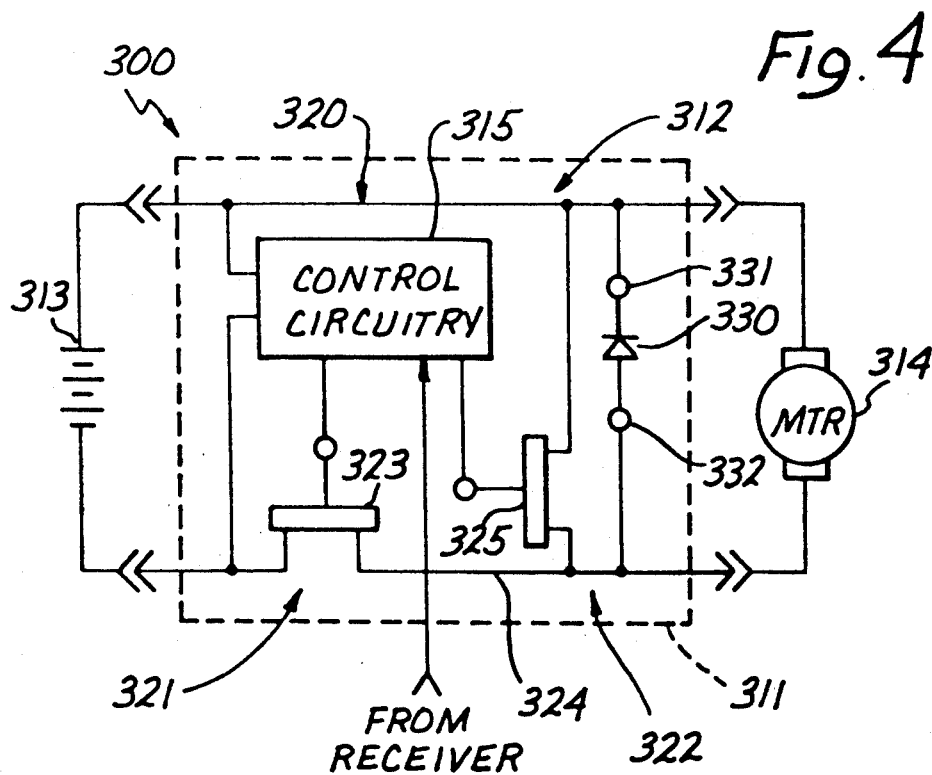
FIG. 4 is a schematic diagram of a fourth controller that includes an unfused, pluggable flyback diode component.

Another fuse placement is shown in the controller 200 (FIG. 3). The controller 200 is similar in many respects to the controller 100 and so only differences are described in further detail. References numerals are increased by one hundred over those designating similar parts of the controller 100.

The braking componentry 222 in the controller 200 includes a semiconductor device 225 and a diode 225a. The diode 225a is a separate component apart from the semiconductor device 225. But, the diode 225a is connected in parallel with the semiconductor device 225 to form a parallel combination something like the parallel combination inherent in the semiconductor device 25 of the controller 10. A fuse 225' is connected in series with that parallel combination. Thus, both the current flowing through the semiconductor device 225 and the diode 225a flows through the fuse 225'.

The controller 300 uses the flyback diode as diode and a fuse. The controller 300 is generally similar in other respects to the controllers 100 and 200. Reference numerals designating similar parts are increase by one hundred over those of the controller 200.

Thus, the controller 300 includes means in the form of braking componentry 322 for providing a variable-resistance path—a switchable low-resistance path—across the motor terminals. The braking componentry 322 includes means in the form of a semiconductor device 325 for providing a switchable low-resistance path between the motor terminals. It also includes means in the form of a diode component 330 for conducting flyback current. The diode component 330 is a separate component apart from the semiconductor device and it is mounted to facilitate replacement. The diode component 330 serves as a fuse as well as a flyback diode. If it blows, the operator simply replaces it.

For that purpose, the diode component 330 may take any of various forms facilitating replacement. It may, for example, be configured as shown in FIG. 5 in order to plug onto terminal posts 331 and 332 shown in FIG. 4 on the circuitboard 311. Considering FIG. 5 in further detail, the diode component 330 includes a diode 333 having leads 334 and 335 that are connected to connectors 336 and 337 to form a component similar to the pluggable fuse 100 described in the parent application. The connectors 336 and 337 plug onto the terminal posts 331 and 332.

Any of the previously described RC controllers may be constructed with a housing 440 as shown for the controller 400 in FIG. 6. Some of the components of the controller circuit are contained within the housing 440. But the counterpart to the diode component 330 is not. Thus, the controller 400 includes a diode 430 that serves as a flyback diode and a fuse. It may be mounted on the exterior of the housing to facilitate replacement. The controller 400 includes two connectors 441 and 442 on the exterior of the housing 440 for that purpose. They may take any of various forms, including clips. As illustrated in FIG. 6, they take the form of solder pads to which the diode 430 is connected by soldering. Of course, the diode 430 could be mounted apart from the housing 440 without departing from the inventive concepts disclosed.

FIG. 6 also illustrates cabling that is part of the circuit of the controller 400. It is similar to cabling that may be employed in the other controllers already described. The cabling includes a line 451 and connector 452 that couple the controller 400 to a receiver 444. It also includes a line 453 extending between terminals 454 and 455. Those terminals connect to the first battery terminal of the battery 413 and the first motor terminal of the drive motor 414. Another line 456 extends to a terminal 457 that connects to the second battery terminal. Still another line 458 extends to a terminal 459 that connects to the second motor terminal, and yet another line 460 extends from the controller circuitry to the terminal 454. Of course, the terminals on the cabling may take any of various forms, including direct soldering of the cable to the battery and motor terminals.

In terms of the controller 10, for example, the line 453 serves as the first unfused leg 20, the terminal 454 serves as the first input terminal 16, and the connector 455 serves as a first output terminal 18. The lines 456 and 458 serve as part of the second unfused leg 24, while the terminals 457 and 459 serve respectively as the second input terminal 17 and the second output terminal 19. The line 460 couples the speed control circuitry and braking circuitry of the controller 400 to the first battery terminal in a manner that is functionally the equivalent of the connections illustrated in FIG. 1 for the controller 10.

Thus, the first unfused leg of the controller 400 is entirely exterior to the housing 440. It is a line connected directly from the first battery terminal to the first motor terminal to provide resistance and high current capability. The line 453 may be considered part of the controller circuitry, but it may be omitted from the controller without departing from the inventive concepts disclosed. In other words, installation of a first unfused leg may be left to the user.

FIG. 7 illustrates a controller 500 that is configured to operate with a separate first unfused leg. The controller 500 is generally similar to the controllers already described, so only differences are described in further detail. Reference numerals are increased by five hundred over those designating similar parts of the controller 10 in FIG. 1.

The controller 500 includes a circuit 512. The circuit 512 is arranged to enable operation with a separately provided first unfused leg connected between the first battery terminal 516' on the battery 513 and the first motor terminal 518' on the drive motor 514. In other words, the circuit 512 is arranged so that the controller 500 need only be connected to the first and second battery terminals 516' and 517' and to the second the motor terminal 519'. It does not need to be connected to the first motor terminal 518'. The user can install a first unfused leg 570 between the first battery terminal 516' and the first motor terminal 518', preferably a heavy wire soldered to the battery and motor terminals for minimum resistance and maximum current carrying capability.

From another viewpoint, the first input terminal 516 on the controller 500 may be considered to really be a first input terminal and a first output terminal combined. It serves both the function of the coupling the first battery terminal to the control circuitry (accomplished by the first input terminal 16 on the controller 10), and the function of coupling the braking componentry 522 to the first motor terminal (accomplished by the first output terminal on the controller 10). With that arrangement, a fuse 571 may be located between the battery and the first input terminal 516 of the controller. The fuse 571 protects a flyback diode 525a in the controller 500 and it may be located as illustrated because current to the drive motor 514 flows through the separately supplied first unfused leg 570. It does not flow through the fuse 571 and cause and undesired voltage drop. Of course, any of the other controllers previously described can be operated with a separately supplied first unfused leg without departing from the other inventive concepts disclosed.

Thus, this application focuses on variations of a fuse-protected RC controller. Although exemplary embodiments have been shown and described, many changes, modifications, and substitutions may be made by one having ordinary skill in the art without necessarily departing from the spirit and scope of the invention.

What is claimed is:

1. An RC controller, comprising:
 a circuitboard; and
 means defining a circuit on the circuitboard for variably coupling power from a battery to a drive motor of a radio controlled model;
 the circuit having an input port that includes a positive input terminal for connection to the positive terminal of the battery and a negative terminal for connection to the negative terminal of the battery;
 the circuit having an output port that includes first and second output terminals for connection to the motor;
 the circuit having a first unfused leg electrically coupling the positive input terminal and the first output terminal;
 the circuit having a second unfused leg electrically coupling the negative input terminal and the second output terminal;
 the circuit including means defining braking componentry connected across the output terminals for electrically coupling the output terminals with a low resistance path in parallel with the motor in order to brake the motor under operator control; and
 the circuit including means defining a fuse in series with the braking componentry for protecting the braking componentry from damage in the event the input terminals are connected to the battery with polarity reversed;
 wherein the means defining braking componentry includes means in the form of a semiconductor device electrically connected across the output terminals for braking the motor under operator control and the means defining braking componentry includes means in the form of a diode electrically connected across the output terminals for conducting current during flyback periods of drive motor operation.

2. An RC controller as recited in claim 1, wherein the fuse is connected in series with the diode so that current flowing through the diode also flows through the fuse.

3. An RC controller as recited in claim 1, wherein the diode is connected in parallel with the semiconductor device to form a parallel combination and the fuse is connected in series with that parallel combination.

4. An RC controller as recited in claim 3 wherein the semiconductor device includes the diode as an integral part of the semiconductor device.

5. An RC controller as recited in claim 1, wherein the diode is a separate component apart from the semiconductor device.

6. An RC controller as recited in claim 1, wherein the RC controller includes a housing on which the circuitboard is mounted and the fuse is mounted on the exterior of the housing.

7. An RC controller as recited in claim 1, wherein the RC controller includes means in the form of a cabling for interconnecting the RC controller to the battery and the motor, and the unfused leg is included in the cabling;

8. An RC controller, comprising:
 means in the form of a circuit adapted to be mounted on an RC model and interconnected to a receiver, a battery, and a drive motor on the RC model for purposes of controlling flow of energy from the battery to the drive motor according to information received by the receiver;
 the circuit including first and second input terminals, each of which input terminals is adapted to be connected to a respective one of first and second battery terminals on the battery;
 the circuit including first and second output terminals, each of which output terminals is adapted to be connected to a respective one of first and second motor terminals on the motor;
 the circuit including means in the form of a first unfused leg connected to the first input terminal and first output terminal for providing a low-resistance path between those terminals for efficient energy transfer purposes;
 the circuit including means in the form of a second unfused leg connected to the second input terminal and the second output terminal for providing a variable-resistance path between those terminals for motor control purposes;
 the circuit including means in the form of braking componentry connected across the first and second output terminals for providing a variable-resistance path between those terminals for braking purposes; and
 the circuit including means in the form of a fuse connected in series with the braking componentry for protecting the braking componentry from damage in the event of reversed polarity caused by a user connecting the battery terminals to the input terminals incorrectly;
 wherein the braking componentry includes means in the form of a semiconductor device electrically connected across the first and second output terminals for providing a switchable low-resistance path between the first and second output terminals;
 wherein the braking componentry includes means in the form of a diode electrically connected across the first and second output terminals for conducting flyback current; and wherein the fuse is connected so that current flowing through the diode also flows through the fuse.

9. An RC controller, comprising:

means in the form of a circuit adapted to be mounted on an RC model and interconnected with a receiver, a battery, and a drive motor on the RC model for purposes of controlling the flow of energy from the battery to the drive motor according to information received by the receiver;

the circuit including a first input terminal for connection to a first battery terminal of the battery and to a first motor terminal of the drive motor connected between the first battery terminal and the first motor terminal;

the circuit including a second input terminal for connection to a second battery terminal on the battery;

the circuit including an output terminal for connection to a second motor terminal on the motor;

the circuit including means in the form of a second unfused leg connected to the second input terminal and the output terminal for providing a variable-resistance path between those terminals for motor control purposes;

the circuit including means in the form of braking componentry connected to the first input terminal and the output terminal for providing a switchable low-resistance path across the first and second motor terminals for braking purposes; and the circuit including means in the form of a fuse connected in series with the braking componentry for protecting the braking componentry from damage in the event of reversed polarity caused by a user connecting the battery terminals to the input terminals incorrectly.

10. An RC controller as recited in claim 9, wherein:

the braking componentry includes means in the form of a semiconductor device electrically connected across the first input terminal and the output terminal for providing a switchable low-resistance path between those terminals; and the braking componentry includes means in the form of a diode electrically connected across the first and second output terminals for conducting flyback current.

11. An RC controller as recited in claim 10, wherein the fuse is connected so that current flowing through the diode also flows through the fuse.

12. An RC controller as recited in claim 10, wherein the diode is connected in parallel with the semiconductor device to form a parallel combination and the fuse is connected in series with that parallel combination.

13. An RC controller as recited in claim 12, wherein the semiconductor device includes the diode as an integral component of the semiconductor device.

14. An RC controller as recited in claim 12, wherein the diode is a separate component apart from the semiconductor device.

15. An RC controller as recited in claim 9, wherein:

the RC controller includes a circuitboard on which the circuit is mounted and an input line having a first end connected to the circuitboard and a second end for connection to the first terminal of the battery; and the fuse is located in series with the input line between the first and second ends.

16. An RC controller, comprising:

means in a form of a circuit adapted to be mounted on an RC model and interconnected with a receiver, a battery, and a drive motor on the RC model for purposes of controlling the flow of energy from the battery to the drive motor according to information received by the receiver;

the circuit including a first input terminal for connection to a first battery terminal of the battery and to a first motor terminal of the drive motor;

the circuit including a second input terminal for connection to a second battery terminal on the battery;

the circuit including an output terminal for connection to a second motor terminal on the motor;

the circuit including means in the form of a second unfused leg connected to the second input terminal and the output terminal for providing a variable-resistance path between those terminals for motor control purposes; and the circuit including means in the form of braking componentry connected to the first input terminal and the output terminal for providing a switchable low-resistance path between those terminals for braking purposes;

the braking componentry including means in the form of a semiconductor device, which semiconductor devices does not include a protective diode;

the circuit including means in the form of a diode component electrically connected across the first input terminal and the output terminal for conducting flyback current, which diode component is a separate component apart from the semiconductor device; and the RC controller including a housing on which the circuit is mounted, the diode component being mounted so that it is user-accessible from the exterior of the housing to facilitate replacement in the event of damage caused by a user connecting the battery terminals to the input terminals incorrectly.

17. An RC controller as recited in claim 16, wherein the diode component is pluggable.

18. An RC controller as recited in claim 16, further comprising means in the form of first and second terminals on the exterior of the housing for providing two user-accessible terminals, the diode being connected to the first and second terminals and each of the first and second terminals being connected to a respective one of the first input terminal and the output terminal.

19. An RC controller as recited in claim 18, wherein the two terminals on the housing take the form of conductive elements to which the diode component can by attached by soldering.

* * * * *